US012717278B2

(12) United States Patent
Nicoud et al.

(10) Patent No.: US 12,717,278 B2
(45) Date of Patent: Aug. 25, 2026

(54) MICROMECHANICAL COMPONENT, PARTICULARLY A TIMEPIECE WHEEL, PARTICULARLY AN ESCAPEMENT WHEEL, THE SURFACE OF WHICH IS OPTIMISED

(71) Applicant: ETA SA Manufacture Horlogere Suisse, Grenchen (CH)

(72) Inventors: Serge Nicoud, Couvet (CH); Samuel Vignier, Saint-Maurice-sous-les-Cotes (FR); Sébastien Roder, Bienne (CH); Jean-Luc Helfer, Le Landeron (CH); Christian Charbon, Chezard-St-Martin (CH); Frédéric Kohler, Avry-sur-Matran (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 728 days.

(21) Appl. No.: 18/041,584

(22) PCT Filed: Aug. 31, 2021

(86) PCT No.: PCT/EP2021/074026
§ 371 (c)(1),
(2) Date: Feb. 14, 2023

(87) PCT Pub. No.: WO2022/058159
PCT Pub. Date: Mar. 24, 2022

(65) Prior Publication Data

US 2023/0305492 A1 Sep. 28, 2023

(30) Foreign Application Priority Data

Sep. 15, 2020 (EP) .................................... 20196229

(51) Int. Cl.
*G04B 15/14* (2006.01)
*G04B 31/08* (2006.01)

(52) U.S. Cl.
CPC ............ *G04B 15/14* (2013.01); *G04B 31/08* (2013.01)

(58) Field of Classification Search
CPC ................................ G04B 15/14; G04B 31/08
See application file for complete search history.

(56) References Cited

U.S. PATENT DOCUMENTS

| | | | | |
|---|---|---|---|---|
| 3,694,885 A | 10/1972 | Simon-Vermot | | |
| 9,658,597 B2 | 5/2017 | Dubois et al. | | |
| 10,385,155 B2 | 8/2019 | Letondor et al. | | |
| 11,092,932 B2 | 8/2021 | Fussinger et al. | | |
| 2008/0123475 A1* | 5/2008 | Fujimori | G04D 3/0094 | 368/322 |
| 2013/0105454 A1 | 5/2013 | Charbon et al. | | |
| 2015/0248112 A1 | 9/2015 | Stranczl et al. | | |
| 2017/0146955 A1 | 5/2017 | Charbon et al. | | |

FOREIGN PATENT DOCUMENTS

| | | | | |
|---|---|---|---|---|
| CH | 51 4873 A | 7/1971 | | |
| CN | 103088189 A | 5/2013 | | |
| CN | 107632507 A | 1/2018 | | |
| CN | 107632509 A | 1/2018 | | |
| EP | 2 586 879 A1 | 5/2013 | | |
| EP | 2 952 971 A1 | 12/2015 | | |
| EP | 3 171 229 A1 | 5/2017 | | |
| EP | 3 171 230 A1 | 5/2017 | | |
| EP | 3 273 307 A1 | 1/2018 | | |
| GB | 2085620 A | * | 4/1982 | G04B 19/042 |
| JP | 4-346692 A | 12/1992 | | |
| JP | 2013-96009 A | 5/2013 | | |
| JP | 2015-230309 A | 12/2015 | | |
| JP | 2017-96925 A | 6/2017 | | |
| JP | 2018-13483 A | 1/2018 | | |
| JP | 2018-13484 A | 1/2018 | | |
| KR | 10-2015-0053791 A | 5/2015 | | |
| KR | 10-2015-0132024 A | 11/2015 | | |
| WO | WO 2008/052378 A2 | 5/2008 | | |
| WO | WO 2008/052378 A3 | 5/2008 | | |
| WO | WO 2017/102661 A1 | 6/2017 | | |

OTHER PUBLICATIONS

English translation of WO2008/052378 obtained form EPO Espacenet Sep. 30, 2025. (Year: 2025).*
Korean Office Action issued Mar. 19, 2025, in corresponding Korean Patent Application No. 10-2023-7008248 (with English Translation), 7 pages.
International Search Report issued Oct. 13, 2021 in PCT/EP2021/074026 filed on Aug. 31, 2021 2 pages.
Combined Chinese Office Action and Search Report issued on Dec. 23, 2024 in Chinese Patent Application No. 202180055060.1 (with English translation of Office Action), 19 pages.
Office Action issued Aug. 28, 2024, in corresponding Korean Patent Application No. 10-2023-7008248 (with English Translation), 11 pages.
Office Action issued Mar. 5, 2024, in corresponding Japanese Patent Application No. 2023-511636 (with English Translation), 10 pages.

* cited by examiner

*Primary Examiner* — Adam Krupicka
(74) *Attorney, Agent, or Firm* — Oblon, McClelland, Maier & Neustadt, L.L.P.

(57) ABSTRACT

Micromechanical component, particularly a timepiece wheel, particularly an escapement wheel, including a substrate with a first material including at least nickel and phosphorus, which substrate is covered, on at least one surface of the substrate of the wheel, by a coating of a second material including at least nickel and poorer in phosphorus than the first material, or devoid of phosphorus, and the second material constitutes the peripheral layer of the wheel at this at least one surface of the substrate.

18 Claims, No Drawings

MICROMECHANICAL COMPONENT, PARTICULARLY A TIMEPIECE WHEEL, PARTICULARLY AN ESCAPEMENT WHEEL, THE SURFACE OF WHICH IS OPTIMISED

CROSS REFERENCES TO RELATED APPLICATIONS

This application is a national stage of International Patent Application No. PCT/EP2021/074026 filed on Aug. 31, 2021, and claims priority to European Patent Application No. 20196229.7 filed on Sep. 15, 2020, all of which are incorporated herein by reference in their entireties.

FIELD OF THE INVENTION

The invention relates to a micromechanical component, particularly a timepiece wheel the surface of which is optimised, particularly an escapement wheel.

The invention also relates to a timepiece escapement mechanism including at least one wheel of non-magnetic nature constituting an escape wheel or a pallet.

The invention relates to the field of timepiece mechanisms, and more particularly escapement mechanisms including at least one escape wheel and at least one pallet, of which at least one of them is of non-magnetic nature.

BACKGROUND OF THE INVENTION

In Swiss lever timepiece escapement mechanisms, the Swiss lever escape wheels are historically made of nickel-plated steel, and are sensitive to magnetic fields.

Alternatives are known with materials such as nickel-phosphorus NiP12 implemented by “LIGA” (Lithographie und Galvano-Abformung, meaning lithography, electroplating, moulding) method, which have a non-magnetic behaviour.

However, the use of such materials, nickel-phosphorus, or similar, may prove to be sensitive in certain climatic conditions, which are likely to lead to a degradation of performances, particularly in terms of amplitude regularity, stoppages, or also ageing, especially when the two antagonistic components of the friction torque are produced in similar LIGA materials.

SUMMARY OF THE INVENTION

The invention proposes to solve the technical problem of the resistance of the usual horological lubricant, and more particularly of guaranteeing an epilame effect, in usual climatic conditions, on components made of LIGA NiP12, or similar, non-ferromagnetic, in particular on Swiss lever escape wheels.

To this end, the invention relates to a micromechanical component the surface of which is optimised, particularly a timepiece wheel, particularly an escapement wheel, according to claim 1.

The invention also relates to a timepiece escapement mechanism including at least one such wheel constituting an escape wheel or a pallet.

DETAILED DESCRIPTION OF PREFERRED EMBODIMENTS

The invention relates to the field of micromechanical components, and more particularly timepiece wheels.

The invention proposes to solve the technical problem of the resistance of the usual horological lubricant, in usual climatic conditions, on components made of LIGA NiP12, or similar, non-ferromagnetic, in particular on wheels of a Swiss lever escapement mechanism.

In Swiss lever timepiece escapement mechanisms, the contact between the gathering-pallet made of ruby of the pallet and the tooth of the escape wheel is particularly sensitive, in the same way as the contact between the fork and the pallet-stone pin or between the fork and the pallet banking-pins.

In particular, this concerns ensuring the presence of lubricant on the contact surfaces between the escape wheel and the pallet, and reducing the ageing of the escape wheel and of the pallet.

The main problem is the loss of epilame effect on the plate of the escape wheel, which causes a spreading of the oil and a loss of lubricant at the contact between the tooth of the wheel and the gathering-pallet made of ruby.

The stability of the lubricant at the contact between the gathering-pallets of the pallet and the escape wheel must make it possible to guarantee the consistency of the amplitude.

To this end, the addition of a coating in the form of a layer of galvanic nickel (Ni) preferably, or of chemical nickel (for example NiP6-9), or also nickel-boron deposited chemically, on an escape wheel made of LIGA NiP12 makes it possible to substantially improve the performances of the movements.

Indeed, it has been demonstrated by various tests that this noteworthy improvement is related to a better resistance of the epilame in predetermined climatic conditions, for example at 50° Celsius and at a humidity level of 90%. A better adhesion of the epilame on the material has been observed by the inventors when the quantity of phosphorus on the surface is reduced, and consequently, the resistance of the lubricant is even better when the quantity of phosphorus is low.

In one variant, the coating of galvanic nickel may be an alloy, for example Ni—Fe, or Ni—W, or other.

Thus, the invention relates to a micromechanical component, particularly a timepiece wheel.

This component is advantageously producible by a method for manufacturing timepiece wheels, according to which a substrate is produced with a first material including at least nickel and phosphorus, this substrate is shaped to the geometry of the wheel, and a coating of the substrate is performed, galvanically and/or chemically, on at least one surface of the substrate of the wheel, with at least one second material of low thickness, particularly less than 10 micrometres, which constitutes a peripheral layer of the wheel at this at least one surface of the substrate of the wheel, and which includes at least nickel and which is poorer in phosphorus than the first material, or which includes nickel and is devoid of phosphorus.

More particularly, this first material is non-magnetic.

More particularly, this second material is non-magnetic. More specifically, it has a non-magnetic nature.

It is noted that nickel is not non-magnetic, and that NiP6-9% is not necessarily so, it is the low thickness of the deposit that gives the part its non-magnetic nature.

In a particular embodiment, the substrate is a nickel-phosphorus of formulation NiPx, with x between 1% and 15% by weight, or more particularly with x between 10% and 15% by weight, the latter range making it possible to guarantee the non-magnetic nature of the coating.

The coating covering the substrate is poor in phosphorus and its thickness is, but not limited to, between 0.2 micrometres and 10.0 micrometres, and, even more particularly between 0.2 micrometres and 2.0 micrometres.

Preferably, the coating has a thickness of 0.5 micrometres.

The coating treatment with a coating poor in phosphorus, according to the invention, may be carried out galvanically.

It is possible to apply a heat treatment to the substrate before the deposition operation, particularly galvanic, or, also to apply a heat treatment to the assembly formed by the substrate and its coating after the deposition operation, particularly galvanic.

It is also possible to apply a chemical treatment to the substrate to modify its surface features so as to facilitate the adhesion of the coating, particularly galvanically.

Alternatively, the coating treatment with a coating poor in or devoid of phosphorus, according to the invention may be carried out chemically, according to a method for applying chemical nickel, which may be pure nickel, or a nickel-phosphorus poor in phosphorus, for example NiP6-9, with 6% to 9% by weight of phosphorus, or also nickel-boron NiB.

The addition of a layer of nickel, or of NiP6-9, or of NiB, makes it possible to increase the stability of the epilame in all climatic conditions, the adhesion of the epilame and therefore the resistance of any usual horological lubricant.

More particularly, the epilame used is a formulation based on fluorine.

The lubricant may, also, be deposited on an escapement wheel with a complement in the form of a paste based on molybdenum disulphide $MoS_2$, which acts as lubricant and lubricant sponge.

Advantageously, the escapement wheel concerned has a geometry making it possible to reduce to a minimum the contact surfaces, for example the use of a rounded-off pallet is preferred, which is a pallet the active faces of the fork of which, intended to come into contact with the plate pin and the banking-pins, are rounded, which makes it possible to have a contact point instead of a contact line.

An innovative embodiment of escapement mechanism includes a pallet made of LIGA, or a pallet of which at least the pallet-stones are made of LIGA. In such a case, the portions made of LIGA of the pallet are subjected to the same problem, and the same solution is applicable.

The invention makes it possible to guarantee normal ageing conditions, a consistency of the amplitude and the absence of stoppages, particularly in the presence of rounded-off LIGA nickel-phosphorus pallets, which ensure a better shock resistance than silicon pallets, for example.

Thus, in a preferred manner, a method for manufacturing such a micromechanical component, particularly a timepiece wheel, is implemented according to which:

a substrate is manufactured with a first material including at least nickel and phosphorus, and a coating of this substrate is performed, on at least one surface of the substrate of the wheel, with at least one second material that constitutes a peripheral layer of the wheel at this at least one surface of the substrate;

this at least one second material includes at least nickel, and is poorer in phosphorus than the first material, or this at least one second material includes nickel and is devoid of phosphorus.

More particularly, this coating of the substrate is performed, on at least one surface adjoining a friction surface of the wheel, with this at least one second material, which constitutes a peripheral layer of the wheel at this at least one surface adjoining a friction surface. "Adjoining" means that the two surfaces are contiguous, or at least tangential, their intersection is not empty, even if it is limited to an isthmus of very small section.

Such a micromechanical component, particularly a timepiece wheel, thus includes an optimised surface.

This micromechanical component, and more particularly this timepiece wheel, includes a substrate in a first material including at least nickel and phosphorus. According to the invention, this substrate is covered, on at least one surface of the substrate of the wheel, by a coating of a second material including at least nickel and poorer in phosphorus than the first material, or devoid of phosphorus, and the second material constitutes the peripheral layer of the wheel at the at least one surface of the substrate.

More particularly, the coating of the substrate covers the substrate on the surfaces of the wheel other than the guide surfaces of the wheel for its pivoting or for its guiding according to a single degree of freedom. Even more particularly, the coating of the substrate covers the substrate on all of the surfaces of the wheel other than the guide surfaces.

More particularly, the substrate is covered, on at least one surface adjoining a friction surface of the wheel, by a coating of a second material including at least nickel and poorer in phosphorus than the first material, or devoid of phosphorus, and the second material constitutes the peripheral layer of the wheel at the at least one surface adjoining a friction surface.

More particularly, the coating covers the substrate on at least one surface adjoining the friction surfaces of the wheel other than the guide surfaces of the wheel for its pivoting or for its guiding according to a single degree of freedom.

Even more particularly, the coating of the substrate covers the substrate on all of the surfaces adjoining the friction surfaces of the wheel other than the guide surfaces of the wheel for its pivoting or for its guiding according to a single degree of freedom.

Even more particularly, the coating of the substrate covers the substrate on all of the surfaces adjoining the friction surfaces of the wheel including the guide surfaces of the wheel for its pivoting or for its guiding according to a single degree of freedom.

More particularly, the coating of the substrate covers the substrate on all of the surfaces of the wheel including the guide surfaces of the wheel for its pivoting or for its guiding according to a single degree of freedom.

More particularly, the first material only includes nickel and phosphorus.

More particularly, the first material includes phosphorus with a proportion by weight between 1% and 15%. Even more particularly, the first material is non-magnetic and includes phosphorus with a proportion by weight of phosphorus between 10% and 15%.

More particularly, the second material with a proportion by weight of phosphorus less than or equal to 15% is selected. More particularly, the second non-magnetic material with a proportion by weight of phosphorus between 10% and 15% is selected.

In one alternative, the second material with a proportion by weight of phosphorus between 6% and 12% is selected. In another alternative, the second material with a proportion by weight of phosphorus between 1% and 6% is selected. In yet another alternative, the second material with a proportion by weight of phosphorus less than or equal to 1% is selected.

More particularly, the second material only includes nickel and phosphorus.

More particularly, the second material includes boron. Even more particularly, the second material only includes nickel and boron.

More particularly, the second material is made of pure nickel.

The coating has a thickness less than 10 micrometres. Even more particularly, the coating has a thickness less than 5 micrometres. Even more particularly, the coating has a thickness between 0.2 micrometres and 2.0 micrometres.

Preferably, the thickness of the coating is 0.5 micrometres.

In yet another variant, the coating is applied with a thickness less than 0.2 micrometres, particularly in the vicinity of 0.1 micrometres.

The invention also relates to a timepiece mechanism, particularly but not limited to an escapement mechanism. In this advantageous application, the timepiece escapement mechanism includes at least one such wheel, for example, formed by an escape wheel or a pallet.

This wheel includes a substrate produced in a first material including at least nickel and phosphorus, the substrate being covered, on all of the surfaces adjoining the friction surfaces of the wheel, by a coating produced in a second material including at least nickel and being poorer in phosphorus than the first material, or being devoid of phosphorus.

The second material constitutes the peripheral layer of the wheel at the surfaces adjoining the friction surfaces included in the wheel to cooperate with a pallet or an escape wheel or a balance.

The wheel may advantageously receive, on its friction surfaces, a lubricating substance, for example an oil or a synthetic grease adapted to precision micro-engineering applications, known by the person skilled in the art of horology. Such a lubricating substance may be combined with a paste based on molybdenum disulphide $MoS_2$.

The wheel may also advantageously receive an epilame layer on at least one surface of the coating other than its friction surfaces in order to make possible a better resistance of the lubricating substance.

The invention claimed is:

1. A timepiece wheel, comprising:

a substrate in a first material comprising nickel and phosphorus, wherein the substrate is covered, on at least one surface of the substrate of the wheel, by a coating of a second material comprising nickel and poorer in phosphorus than the first material, or devoid of phosphorus, the second material constitutes a peripheral layer of the wheel at the at least one surface of the substrate, and the second material has a thickness of less than 0.2 micrometres.

2. The wheel according to claim 1, wherein the substrate is covered, on at least one surface adjoining a friction surface of the wheel, by the coating of the second material.

3. The wheel according to claim 1, wherein the first material includes phosphorus with a proportion by weight between 1% and 15%.

4. The wheel according to claim 3, wherein the first material is non-magnetic and includes phosphorus with a proportion by weight between 10% and 15%.

5. The wheel according to claim 1, wherein the first material only includes nickel and phosphorus.

6. The wheel according to claim 1, wherein the second material is non-magnetic and includes a proportion by weight of phosphorus between 10% and 15%.

7. The wheel according to claim 1, wherein the second material includes a proportion by weight of phosphorus between 6% and 12%.

8. The wheel according to claim 1, wherein the second material includes a proportion by weight of phosphorus between 1% and 6%.

9. The wheel according to claim 1, wherein the second material includes a proportion by weight of phosphorus less than or equal to 1%.

10. The wheel according to claim 9, wherein the second material is devoid of phosphorus.

11. The wheel according to claim 1, wherein the second material only includes nickel and phosphorus.

12. The wheel according to claim 10, wherein the second material includes boron.

13. The wheel according to claim 1, wherein the second material only includes nickel and boron.

14. The wheel according to claim 1, wherein the second material is made of pure nickel.

15. The wheel according to claim 1, wherein the second material has a thickness of from 0.1 micrometres to less than 0.2 micrometres.

16. A timepiece escapement mechanism, comprising:

at least one wheel according to claim 1, constituting an escape wheel or a pallet, wherein the substrate is covered, on all of the surfaces adjoining friction surfaces of the wheel, by the coating of the second material, and the second material constitutes the peripheral layer of the wheel at the surfaces adjoining the friction surfaces included in the wheel to cooperate with a pallet or an escape wheel or a balance.

17. The mechanism according to claim 16, comprising a lubricating substance on the friction surfaces of the wheel.

18. The mechanism according to claim 17, comprising an epilame layer on at least one surface of the coating other than its friction surfaces.

* * * * *